Feb. 22, 1966   J. B. POPPER   3,236,119
LOCKING DEVICE FOR THE CONTROL KNOBS OF INSTRUMENTS
Original Filed Aug. 18, 1959   2 Sheets-Sheet 1

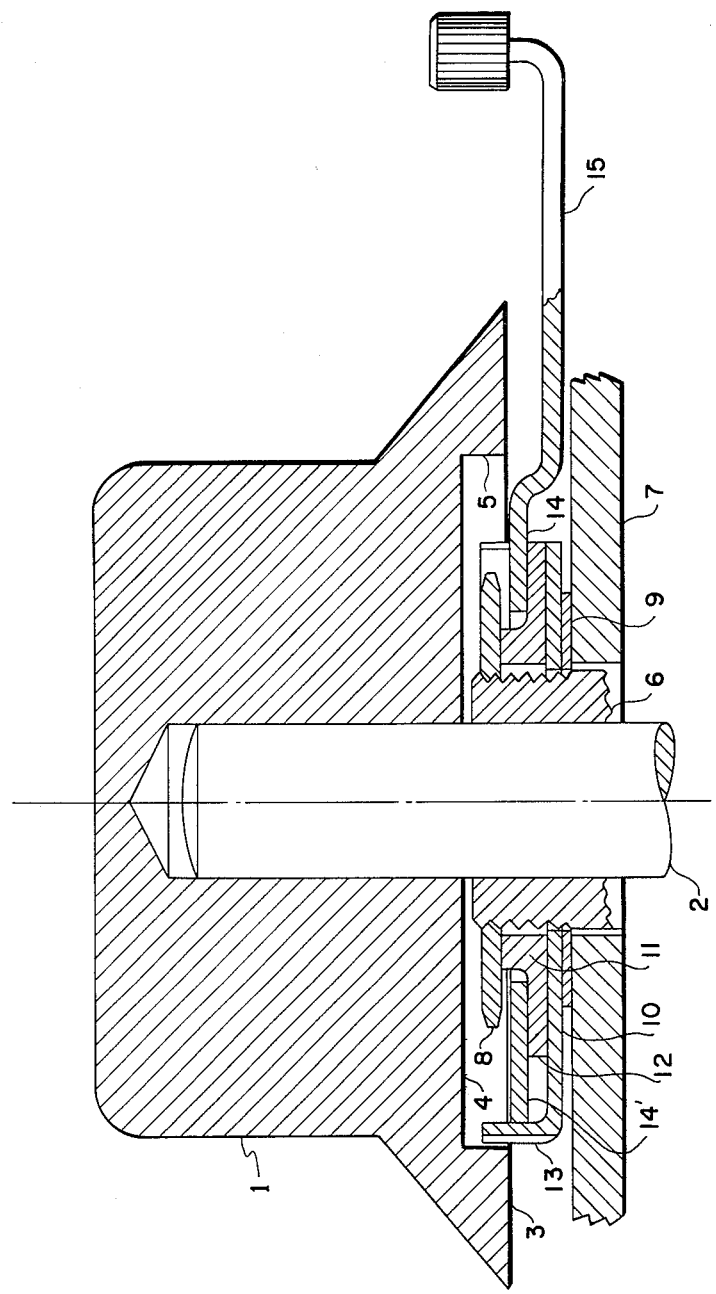

3,236,119
LOCKING DEVICE FOR THE CONTROL KNOBS
OF INSTRUMENTS
Jakhin Boas Popper, Kiryat Motzkin, Israel, assignor to Twinworm Associates, Philadelphia, Pa., a partnership of Pennsylvania
Continuation of application Ser. No. 834,558, Aug. 18, 1959. This application Dec. 14, 1962, Ser. No. 244,714
Claims priority, application Israel, Aug. 21, 1958, 11,665
14 Claims. (Cl. 74—531)

This present application is a continuation of application Serial No. 834,558, filed August 18, 1959, now abandoned.

The present invention relates to locking members for the control knobs of variable resistors, variable capacitors, and the like, which are used in many electrical and electronic instruments.

Such locking members have the purpose of securing the knob in the desired position of adjustment and of preventing any undesired change of this adjustment by accidental touch or by vibration.

Locking means for this purpose are known. However, the known types either require too many constructional parts, or cannot be mounted on existing instruments without requiring constructional changes thereof.

It is the object of the invention to provide a locking device for the purpose referred to that is simple in construction, efficient in use, mountable on knob-controlled instruments without constructional modification thereof, and does not exert pressure on the shaft in either axial or radial direction.

The invention consists of a locking device for the control knob of knob-controlled instruments comprising an annular disk having at its circumference, substantially normal to the plane of the disk, two or more resilient locking fingers adapted to be spread outwards and thereby to be applied against a cooperating surface of the control knob, and an annular cam member adapted to be disposed in register with the disk and to be turned relative to it and having such a size and shape that in certain angular positions the cam member spreads the fingers of the disk into locking position while releasing them in other angular positions.

Both the disk and cam member will be mounted on a cylindrical part of the knob mounting. It is preferred that the opening of the cam member be larger than such cylindrical part so as to admit of a slight radial displacement relative to the mounting during the locking operation, whereby all fingers can be applied uniformly against the cooperating surface or surfaces of the knob even though the cam member bears initially against one finger only.

It is also preferred so to shape the cam member that its angular displacement through a small angle is sufficient to lock or unlock the knob.

The invention is illustrated, by way of example only, in the accompanying drawings in which:

FIGURE 3 is a fragmentary axial section, drawn to a larger scale, of a control knob provided with a locking device according to the invention.

Figure 1:
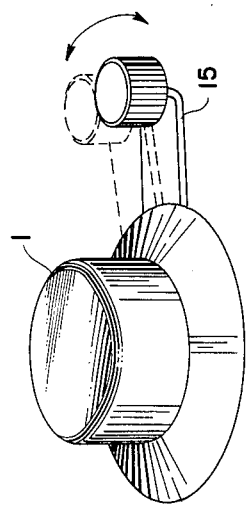
FIGURE 1 is a perspective view of a control knob of an instrument provided with a locking device according to the invention.

The control knob 1 of conventional shape is detachably secured to the axle 2 of an adjustable instrument part by means of a screw. Its rim 3 overhangs its bottom surface 4 and includes a cylindrical inner friction or braking surface 5. The axle 2 is journalled in the conventional manner in a cylindrical bushing 6 secured in any suitable manner to a wall, base or panel 7 of the instrument. The bushing has an outer thread for the reception of a nut 8 which serves to fasten the bushing 6, i.e. the instrument, to the part 7. Seated on the bushing 6 is an annular disk 10 which rests on a washer 9 and is secured in axial direction by a cylindrical collar 11 with flange 12, which collar in its turn is axially locked by the nut 8. The disk 10 is made integral with three resilient fingers 13 projecting from its circumference at right angles to the plane of the disk. The fingers are preferably concave on their outer side and convex on their inner side, or vice versa, which prevents undesired bending thereof other than in the zone of transition between the fingers and the disk. The fingers are disposed with equal distances between them on a circle so much smaller than the diameter of the surface 5 that they are normally clear of the latter but can resiliently be applied against it.

Figure 2:
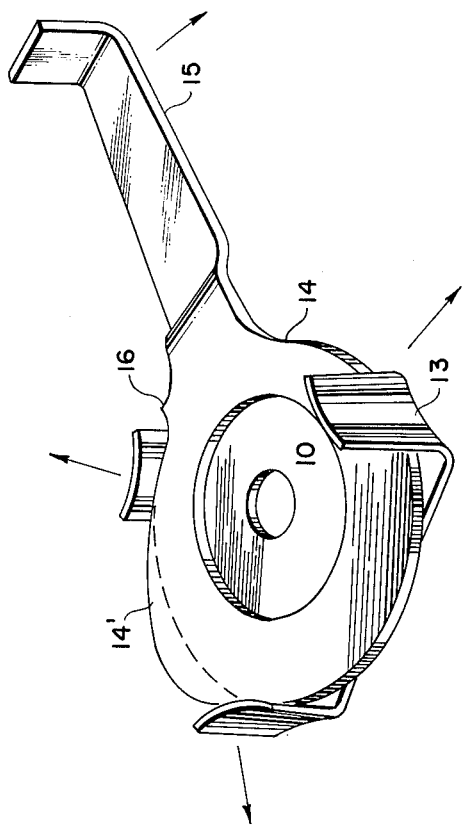
FIGURE 2 is a perspective view of the locking device.

Enclosed between the flanged collar 11 and nut 8 is an annular cam member 14 made integral with a handle 15. The cam member has a central hole larger than the collar 11 and can be turned about the latter with some play in radial direction. Its lobe 14' projects freely through the gap between two adjacent fingers 13 of the disk 10 in the unlocking position but bears against the inner face of one of them in the locking position. Owing to the large hole of the cam member 14, the action of the lobe 14' on one of the fingers 13 not only applies the latter against the surface but also produces the radial displacement of the cam member 14 whereby the two other fingers as well are so applied. Locking takes place by squeezing the cam member in the clockwise direction as indicated by the arrows in FIGURE 2. Unlocking is effected by anti-clockwise movement of the handle and is completed when a shoulder 16 provided at the root of the handle 15 strikes the flank of the finger 13 towards which it is moving.

By the grip of the fingers on the knob, the latter is efficaciously locked. The arrangement of three fingers with equal distances between them, as here illustrated, is preferred, but the device may have a different number of fingers. Similarly, the cam member may have two or more lobes instead of the single lobe of the embodiment here illustrated.

The design of the locking device according to the invention is simple as it requires only two parts in addition to the elements any way required for the control knob arrangement, and these two parts may be made from sheet metal by stamping. Both parts can be mounted on conventional control knobs without constructional modification of the latter.

In view of my invention and disclosure, variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

I claim:

1. In combination: a pair of generally disk-shaped members, one of said members having a plurality of resilient fingers protruding from the plane defined by said one member, and the other of said members having a cam-shaped outer edge, said other member being disposed between said fingers for rotation relative to said one member in a plane substantially parallel to said first-mentioned plane, said cam-shaped edge comprising a section of increasing radius, whereby said cam-shaped edge exerts a force tilting said fingers outward at some angular position of said other member and releases said fingers from said force in other angular positions, and said other member protruding between two of said fingers to prevent rotation of said other member through an angle greater than that defined by said two fingers.

2. In combination: an apparatus comprising a pair of generally disk-shaped members, one of said members having a plurality of resilient fingers protruding from the plane defined by said one member, and the other of said members having a cam-shaped outer edge, said other member being disposed between said fingers for rotation relative to said one member in a plane substantially parallel to said first-mentioned plane, said cam-shaped edge comprising a section of increasing radius, whereby said cam-shaped edge exerts a force tilting said fingers outward at some angular position of said other member and releases said fingers from said force in other angular positions, each such member being provided with a hole located substantially centrally within said member, said apparatus further comprising a shaft traversing both said holes, and a body mounted concentrically on said shaft for rotation integrally with said shaft, said body having a substantially round internal surface, and said fingers extending toward said internal surface and coming into locking engagement with said body when spread apart by said force.

3. The apparatus of claim 2 further characterized in that said other member surrounding said shaft is rotatable relative to said shaft with radial play.

4. The apparatus of claim 1 characterized in that said fingers have a curvature such that the centers of curvature of said fingers are located outward with respect to said fingers.

5. A locking device for an instrument component comprising a rotatable shaft, with a control knob mounted on said shaft and having, on that side of said knob facing said instrument component, a surface substantially in the shape of a surface of revolution, fastening means for fastening said instrument component and locking device to a supporting body, said locking device comprising: an annular disk having a hole to permit passage of said shaft, said annular disk further having a plurality of fingers protruding from the plane defined by said annular disk, said fingers being so dimensioned that said fingers ordinarily are spaced from said surface of revolution but are resiliently deflectable toward said surface of revolution; an annular cam member having a hole to permit passage of said shaft, said cam member being rotatable relative to said disk and comprising a section of increasing radius, whereby said cam member spreads said fingers apart and into locking engagement with a portion of said surface of revolution at some rotational position of said cam member, while releasing said fingers from said locking engagement at other rotational positions, each of said fingers having a friction area on the side of said fingers generally opposite the side coacting with said cam-shaped edge; and means to rotate said cam member.

6. The device of claim 5 further characterized in that said annular cam member is rotatable relative to said shaft with radial play.

7. The device of claim 5 further characterized in that said fingers are three in number, spaced substantially at equal distances from each other.

8. The device of claim 5 further characterized in that said fingers have a curvature substantially concave outward.

9. A locking knob assembly comprising: a knob mounted on a shaft for rotation with said shaft about a common axis, said knob having an annular surface defining an internal cavity; an annular disk surrounding said shaft and having a plurality of fingers extending substantially transversely from said disk at least partly into said cavity, said fingers ordinarily being spaced from said annular surface and being resiliently deflectable toward said surface; means restraining said disk from rotation about said axis; an annular cam member surrounding said shaft and rotatable relative to said disk, said cam member comprising a section of increasing radius, whereby said cam member spreads said fingers apart and into locking engagement with said annular surface at some rotational position of said cam member, while releasing said fingers from said locking engagement at other rotational positions; and means to rotate said cam member.

10. The assembly of claim 9 further characterized in that said annular cam member surrounding said shaft is rotatable relative to said shaft with radial play.

11. The assembly of claim 9 further comprising means for restraining said cam from motion along said shaft.

12. The assembly of claim 9 further comprising a supporting body, said shaft protruding from said supporting body, and said disk being rigidly attached to said supporting body.

13. The assembly of claim 9 further characterized in that said fingers are three in number, spaced substantially at equal distances from each other.

14. The assembly of claim 9 further characterized in that said fingers have a curvature substantially concave outward.

References Cited by the Examiner

UNITED STATES PATENTS

| | | | |
|---|---|---|---|
| 1,853,201 | 4/1932 | Busher | 188—78 |
| 2,558,158 | 6/1951 | Rock | 64—29 |

FOREIGN PATENTS

| | | |
|---|---|---|
| 753,947 | 8/1956 | Great Britain. |

MILTON KAUFMAN, *Primary Examiner.*